MAGNETIC TRANSDUCER

Filed Sept. 22, 1961 7 Sheets-Sheet 1

INVENTORS.
FRED C. CURTIS
MICHAEL I. BEHR
HENRY M. MERRILL
RICHARD E. THOMAS
BY
Christie, Parker & Hale
ATTORNEYS.

May 3, 1966 F. C. CURTIS ETAL 3,249,928

MAGNETIC TRANSDUCER

Filed Sept. 22, 1961 7 Sheets-Sheet 2

INVENTORS.
FRED C. CURTIS
MICHAEL I. BEHR
HENRY M. MERRILL
RICHARD E. THOMAS

BY Christie, Parker & Hale

ATTORNEYS.

MAGNETIC TRANSDUCER

Filed Sept. 22, 1961 7 Sheets-Sheet 3

INVENTORS.
FRED C. CURTIS
MICHAEL I. BEHR
HENRY M. MERRILL
RICHAR E. THOMAS
BY Christie, Parker & Hale
ATTORNEYS.

MAGNETIC TRANSDUCER

WRITE

INVENTORS.
FRED C. CURTIS
MICHAEL I. BEHR
HENRY M. MERRILL
RICHARD E. THOMAS
BY
Christie, Parker & Hale
ATTORNEYS.

MAGNETIC TRANSDUCER

Filed Sept. 22, 1961 7 Sheets-Sheet 5

READ

INVENTORS.
FRED C. CURTIS
MICHAEL I. BEHR
HENRY M. MERRILL
RICHARD E. THOMAS
BY
Christie, Parker & Hale
ATTORNEYS.

INVENTORS.
FRED C. CURTIS
MICHAEL I. BEHR
HENRY M. MERRILL
RICHARD E. THOMAS
BY
Christie, Parker & Hale
ATTORNEYS.

MAGNETIC TRANSDUCER

Filed Sept. 22, 1961

INVENTORS.
FRED C. CURTIS
MICHAEL I. BEHR
HENRY M. MERRILL
RICHARD E. THOMAS
BY Christie, Parker & Hale
ATTORNEYS.

3,249,928
Patented May 3, 1966

3,249,928

MAGNETIC TRANSDUCER

Fred C. Curtis and Michael I. Behr, South Pasadena, Henry M. Merrill, Altadena, and Richard E. Thomas, Monrovia, Calif., assignors to Burroughs Corporation, Detroit, Mich., a corporation of Michigan Filed Sept. 22, 1961, Ser. No. 140,133
14 Claims. (Cl. 340—174.1)

This invention relates to magnetic transducers and, more particularly, to a magnetic transducer for simultaneously reading and writing on a magnetic carrier.

This invention is an improvement over the earlier filed application of Henry M. Merrill and Gardner P. Wilson bearing Serial No. 132,677, filed on August 21, 1961 and assigned to the same assignee as the present invention.

In present day digital data processing systems and operations it is highly desirable to check the recording of a desired signal with a minimum time delay to eliminate any possible sources of error. The magnetic carriers employed in these digital systems have taken the form of the multiple track magnetic tapes utilizing high density recording techniques. The advantage of simultaneously reading and writing from a magnetic carrier, or providing a "write-check" feature, is that the number of elements of a computing system can be minimized if the time delay interval between writing and reading can be substantially reduced, as well as accelerating the rate at which the digital information is delivered to a magnetic carrier. This reduction in time delay has been achieved largely through the incorporation of the reading and writing functions into a single magnetic transducer or package. The time delay is dependent on the spacing between the writing transducer and the reading or "checking" transducer. This spacing and, therefore, the time delay, particularly when a single read-write transducer is employed, is governed by the amount of cross-coupling or cross-talk between the writing structure and the reading structure. Various techniques, both packaging and electrical techniques, have been devised for reducing this cross-coupling or cross-talk between transducing structures. The packaging techniques have included shielding between transducing gaps both within the transducer proper and external shielding. From an electrical standpoint, the cross-talk has been minimized through the use of electrical configurations to effectively cancel out the cross-coupling between read and write portions. An example of this type of magnetic structure is found in Patent No. 2,969,529. None of these techniques have been productive of a completely commercially satisfactory read-write transducer.

In addition to the cross-coupling problems for producing a read-write or dual gap transducer, physical considerations of the magnetic structures and manufacture of the transducer and the components thereof must be considered to produce a practical, commercially acceptable magnetic transducer exhibiting simultaneous read and write capabilities. A commercially acceptable magnetic transducer must have an inter-gap spacing to provide this read-write or "write-check" operation on the order of two milliseconds, particularly when employed in data processing systems.

This invention provides an improved and inexpensive magnetic transducer that is capable of reading and writing simultaneously in a plurality of channels on a magnetic carrier with a minimum amount of cross-coupling or cross-talk. One practical embodiment of the invention is adapted to reading a seven channel magnetic tape with a cross-talk suppression on the order of 35 decibels and which magnetic tape has a width of one-half inch. The electromagnetic structures for this improved dual gap read-write transducer are physically defined and arranged to minimize the cross-coupling or cross-talk between associated read and write transducers for a single channel. In addition, the packaging and organization of the transducer, particularly the electrostatic and electromagnetic elements, has been defined to provide satisfactory and reproducible operations with gap to gap spacings on the order of 0.150 inch. This transducer organization is further advantageously characterized as of modular construction and, in particular, the modular construction of the transducers lead to a simplified, more reliable, and inexpensive manufacturing operation.

In the described embodiment of the invention a plurality of individually electromagnetically shielded transducers are arranged and spaced apart for reading and writing in separate channels on a magnetic carrier. Each reading transducer is arranged in alignment with an individual writing transducer for reading and writing substantially simultaneously on a single channel on a magnetic carrier. The associated reading and writing transducers are spaced apart by shielding means comprising both electrostatic and electromagnetic shielding means and which transducers are arranged in engagement with the outer surfaces of said shielding means adjacent the transducing gaps whereby the transducing gaps are spaced apart on the order of 0.150 inch. The transducer engaging surfaces of the shielding means are defined in terms of a non-magnetic member to prevent inter-action between the shielding means and the transducing portion and, particularly, the formation of any undesired secondary transducing gaps. The shielding means may be further defined to include a non-magnetic element arranged at the magnetic carrier exposed surface of the shielding means and intermediate the transducing gaps to prevent magnetic inter-action between the magnetic carrier and the shielding means and, in particular, between the electromagnetic shielding elements thereof. The transducers arranged in this fashion are oriented about the shielding means in a diverging relationship which may be on the order of 45 degrees to place the pair of associated transducers in an angular relationship for minimizing cross-coupling between the associated pair of transducers.

Specifically, the transducers may be of modular construction and comprise a plurality of insulatively stacked, U-shaped, low reluctance magnetic laminations with a winding wound on at least one arm of the U-shaped laminations. The U-shaped laminations may be individually, electromagnetically shielded and encapsulated by potting or the like to allow them to be handled as a unit and assembled into a carrier defined to accept these modular elements and hold them in a spaced relation in accordance with the intertrack spacing of a magnetic carrier. In the same fashion, the writing transducers may be defined and mounted on a carrier similarly defined. The shielding means that is arranged between the read and write transducer carriers or blocks provides the inter-gap spacing. The shielding means is mounted on a carrier and which means may comprise a stack of alternately arranged electrostatic and electromagnetic shielding elements having at least a central electrostatic shielding element and with the outer shielding element having electrostatic characteristics. In addition, the shielding assembly is mounted on a dividing body having a stack of magnetic laminations arranged adjacent the outer electrostatic shielding surfaces of the shielding means and defined relative to the U-shaped modular transducer assemblies for bridging the U-shaped structure to define a substantially closed loop magnetic path therewith. The assembly of the dual gap, read-write transducer is completed by fastening these three modular elements, read, write, and shielding means carriers, together with a high reluctance magnetic member sandwiched between the read and write carriers to complete the closed loop magnetic structure and provide the necessary transducing gaps.

These and other features of the present invention may be more fully appreciated when considered in the light of the following specification and drawings, in which.

Figure 1:
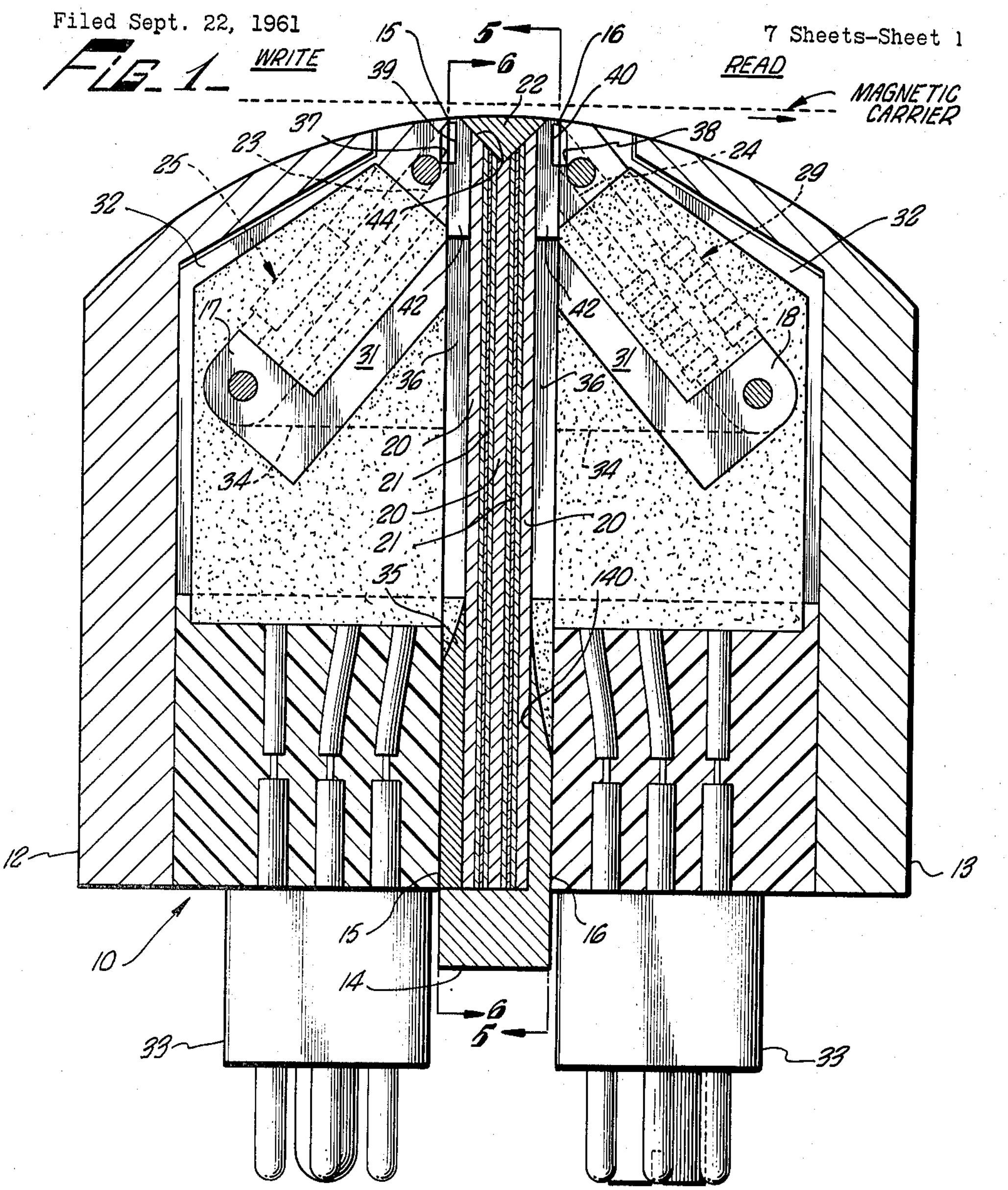
FIGURE 1 is a longitudinal, cross-sectional view of the dual gap read-write transducer with parts shown in elevation and embodying the invention.
Figure 2:
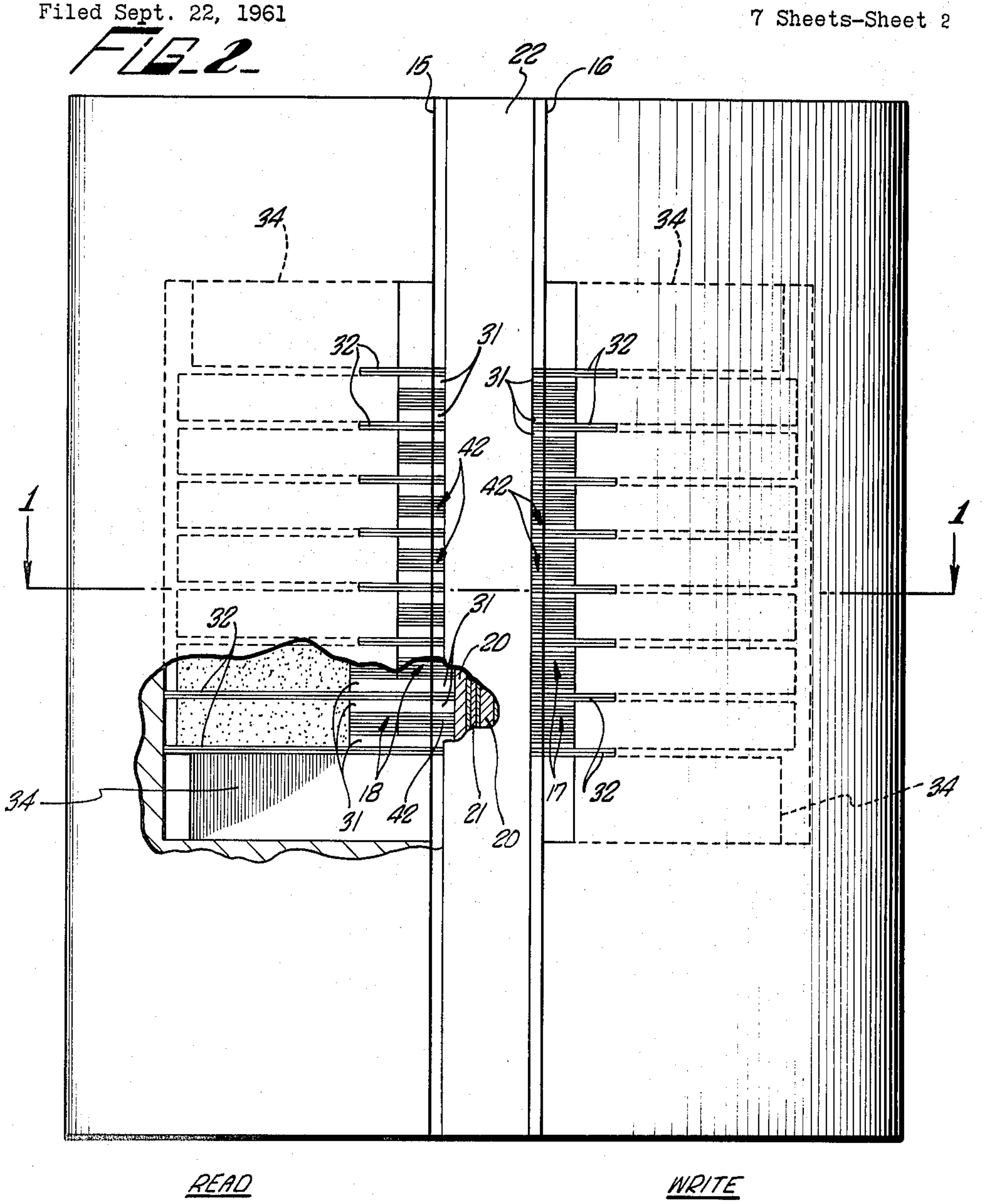
FIGURE 2 is a plan view, with portions broken away, of the magnetic carrier exposed end of the transducer.

Now referring to the drawings, the structural organization of the dual gap read-write transducer 10 as embodied for providing a transducing operation on a magnetic carrier in the form of a magnetic tape of one-half of an inch in width and having seven recording channels for the storage of binary coded digital information will be described. This practical embodiment of the invention will be examined merely to facilitate the description of the invention. Magnetic tapes for use in commercial digital applications presently employ tracks having a width on the order of 0.048 inch for writing and 0.032 inch for reading. Accordingly, the dual gap transducer 10 will be examined in view of this commercial arrangement of a magnetic carrier, although it should be recognized that the concept of this invention is applicable to other magnetic arrangements.

The dual gap read-write transducer 10 as illustrated in FIG. 1 generally comprises a write block or module 12 and a read block or module 13 arranged on opposite sides of a dividing block or module 14 and sandwiching a pair of high reluctance members 15 and 16 respectively arranged therebetween. The write block or module 12 comprises a plurality of electromagnetic transducer structures or modules 17, in this instance seven modules, particularly adapted for writing on a magnetic carrier, while a similar plurality of electromagnetic structures or modules are arranged and mounted on the read block 13 and are particularly adapted for reading from a magnetic carrier. The divider block or module 14 mounts a plurality of alternately and selectively arranged electrostatic and electromagnetic shielding members, respectively identified by the reference characters 20 and 21, and including a non-magnetic, conductive element 22 arranged on the magnetic carrier exposed end of the transducer 10.

With the above general organization of the modules for the dual gap read-write transducer 10 in mind, the detailed structural organization of the sub-modules can be best understood from an examination of the step by step construction of the elements that are incorporated into the write, read, and divider blocks or modules 12, 13, and 14.

Figures 4, 4A:
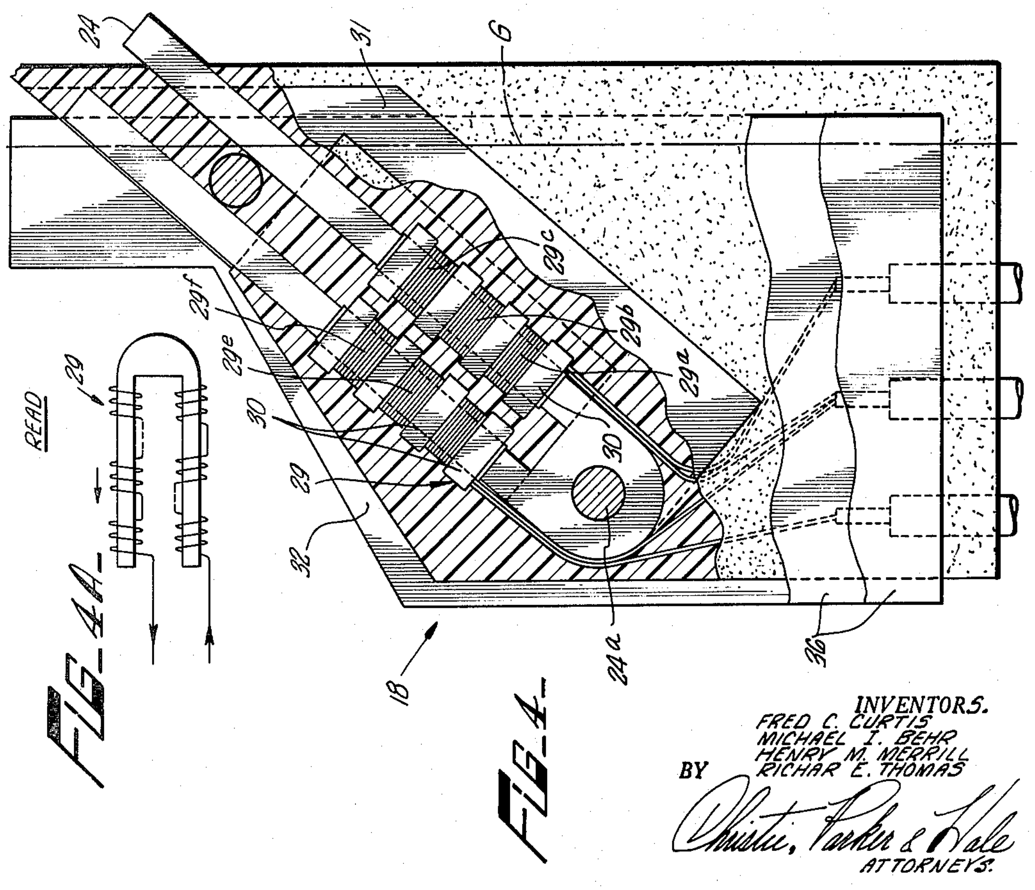
FIGURE 4 is a cross-sectional view, with portions shown in section, of the electromagnetic module for the read portion of the transducer of FIGS. 1 and 2 shown before final processing.
FIGURE 4A is a schematic representation of the arrangement of the read windings illustrated in FIG. 3.

The write and read blocks or carriers 12 and 13 comprise substantially rectangular elements of a non-magnetic material, such as aluminum, each provided with a substantially central cavity 12$^a$ and 13$^a$, respectively, defined to accommodate their respective plurality of write modules 17 and read modules 18, see FIG. 4. To this end, the read and write blocks 12 and 13 are defined with a plurality of spaced channels, similar to the channels 12$^b$ and 13$^b$, extending from the inside edge of the cavities 12$^a$ and 13$^a$, respectively, to the magnetic tape exposed side of the blocks. In addition, the blocks may be provided with securing apertures similar to the apertures 12$^c$ and 13$^c$ to accommodate fasteners for holding the modules of the transducer 10 together.

Figures 3, 3A:
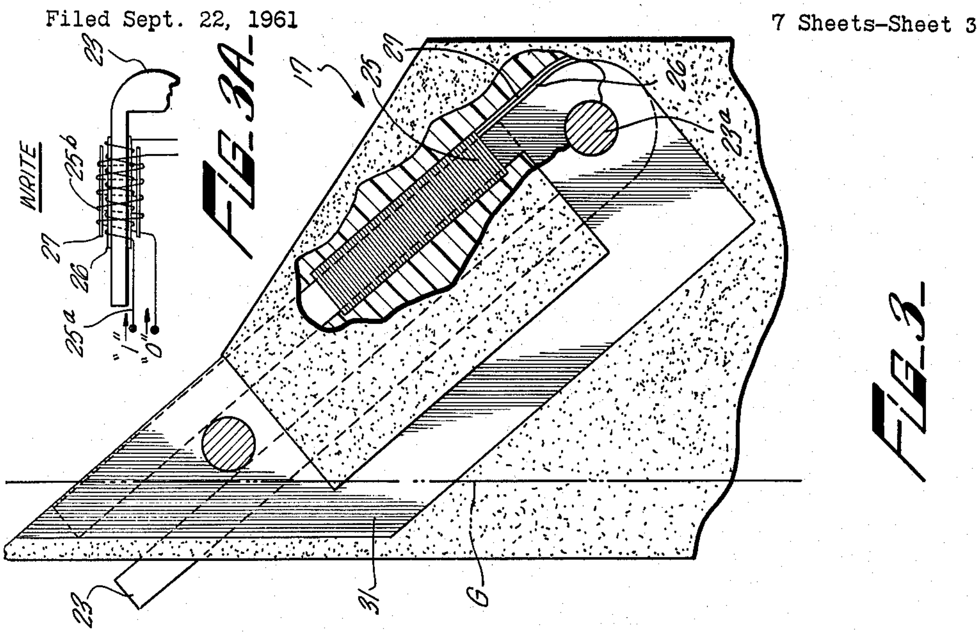
FIGURE 3 is an elevational view, with portions shown in section, of the electromagnetic module for the write portion of the transducer of FIGS. 1 and 2 shown prior to final processing.
FIGURE 3A is a schematic representation of the arrangement of the write windings illustrated in FIGS. 1 and 2.

The write and read electromagnetic structures 17 and 18 are preferably constructed in a modular form and which modular form simplifies the construction, assembly, and testing of the dual gap transducer 10 leading to an inexpensive assembly procedure. The modular arrangement merely requires that each module be constructed and tested in the same fashion and then assembled into the respective write and read divider blocks 12 and 13. The modular assemblies for the write and read structures 17 and 18 are shown in FIGS. 3 and 4, respectively, prior to final turning, grinding, and lapping, and will be seen to include substantially U-shaped magnetic elements 23 and 24. As a result of the final processing of the transducer 10, the portions of the structures 17 and 18 shown to the left and right, respectively, of the dot-dash lines G are removed or ground away. Each of the magnetic elements 23 and 24 comprise a low reluctance, magnetic material and are preferably defined and constructed in terms of thin, ferromagnetic laminations, commercially identified as Hy Mu 80, for example, on the order of 0.0040 inch thick, similar to the laminations identified as 23W and 23R; see FIG. 8. The laminations are individually insulated, stacked, and bonded together to define the U-shaped magnetic elements 23 and 24. The elements 23 and 24 will have a thickness of about 0.048 inch when employed for the use with the above-described magnetic tape or have a thickness in accordance with the width of the tracks in the magnetic carrier for which the transducer 10 is to be used. The closed end of the U-shaped laminations 23W and 23R may include an aligning aperture similar to the apertures 23$^a$ and 24$^a$ to allow an alignment pin to be inserted through the stack for allowing the laminations to be aligned prior to bonding them together. These assemblies, then, define the substantial portions of the magnetic arrangements of the electromagnetic structures 17 and 18.

The electrical portions of the electromagnetic structures 17 and 18 comprise the winding means magnetically coupled thereto. Considering first the construction of the winding means 25 for the write structure 17, it will be noted from both FIGS. 3 and 3A that a single winding means 25 is shown magnetically coupled to the magnetic structure 23. In the practical embodiment, the winding means 25 comprises a pair of coils wound on a single arm of the U-shaped structure 23 and which coils are shown in the schematic view of FIG. 3A, in particular, as comprising the coils 25$^a$ and 25$^b$ wound in opposite directions on the magnetic structure 23, with the coil 25$^b$ wound over the coil 25$^a$ and coextensive therewith. In the procedure for winding the coils 25$^a$ and 25$^b$ the coils are wound on a tubular mounting member 26 adapted to be slidably telescoped over an arm of the U-shaped magnetic structure 25. The coils 25$^a$ and 25$^b$ may be wound in a single operation with the coil 25$^a$, for example, wound over the mounting member 26 in one direction and then the terminal end of the coil is withdrawn a predetermined amount and the coil 25$^b$ is then wound over an insulating sleeve 27 in the opposite direction. The common loop may then be cut to define a pair of writing coils and, electrically, these ends may be connected in common. The ends of the coils are connected to an electrical connector, as will be described. Therefore, this arrangement may be utilized to write a binary one or binary zero selectively and alternately through the energization of one of the coils $25^a$ and $25^b$ to cause the magnetization of the adjacent area of the magnetic tape in opposite directions, or writing a binary one or binary zero.

The reading winding means 29 comprises a pair of coils arranged on both arms of the magnetic structure 24 and are wound as a plurality of multi-layer coils spaced apart by spacing elements, similar to the "Pie" spacers identified by the reference character 30. Each of the coils $29^a$, $29^b$, and $29^c$ are electrically connected in series aiding relationship for placement on an arm of the magnetic structure 24 and with one end of the thus defined coil portion brought back to extend parallel to the arm for connection to an electrical connector. In the same fashion, the coil portions $29^d$, $29^e$, and $29^f$ on the other arm are wound and connected with one end brought back for connection to an electrical connector.

An important aspect of the described construction of the write winding means 25 and the read winding means 29 is the provision for reducing the inter-coil capacitance. In the case of the write winding means 25 the inter-coil capacitance is reduced through the provision of the insulating sleeve 27, while the same function is performed by the "Pie" spacers 30 for the read winding 29. The different insulative arrangements are necessitated by the difference in functions of these coils and the different currents carried by same. Another important aspect of the construction of the electromagnetic structure for the read transducers 18 is that the U-shaped construction allows a pair of coils to be mounted on the opposed arms of the magnetic structure 24 and, therefore, although the coils are electrically connected in a series aiding relationship with regard to the flux detected from the magnetic tape, their arrangement with respect to stray magnetic flux, that may be coupled thereto from the adjacent write transducer or read transducer, is such that the flux cuts the opposed coils to generate voltages that are in opposite directions or have opposed polarities and, therefore, tend to cancel one another and is an important factor in reducing the cross-coupling or cross-talk of the transducer 10.

It should be recognized that the coils are wound with a fine wire, as in conventional magnetic transducers, and require that a heavier wire, one of larger current carrying capacity, be connected thereto. In accordance with the procedure of manufacturing the present invention, these heavier wires can be connected by soldering them to the end terminals of the coils prior to assembly in the transducer body. Assembly in this fashion leads to a reduction in manufacturing costs since, if a lead wire of a coil is broken as a result of the soldering operation, the module by module testing will show this and only a defective module need be discarded rather than the entire transducer, as in the prior art methods. With the assembly of these writing and reading winding means 25 and 29 on the magnetic structures 23 and 24 and the soldering of the heavy lead wires, the assembly of these electromagnetic structures is complete.

Figure 8:
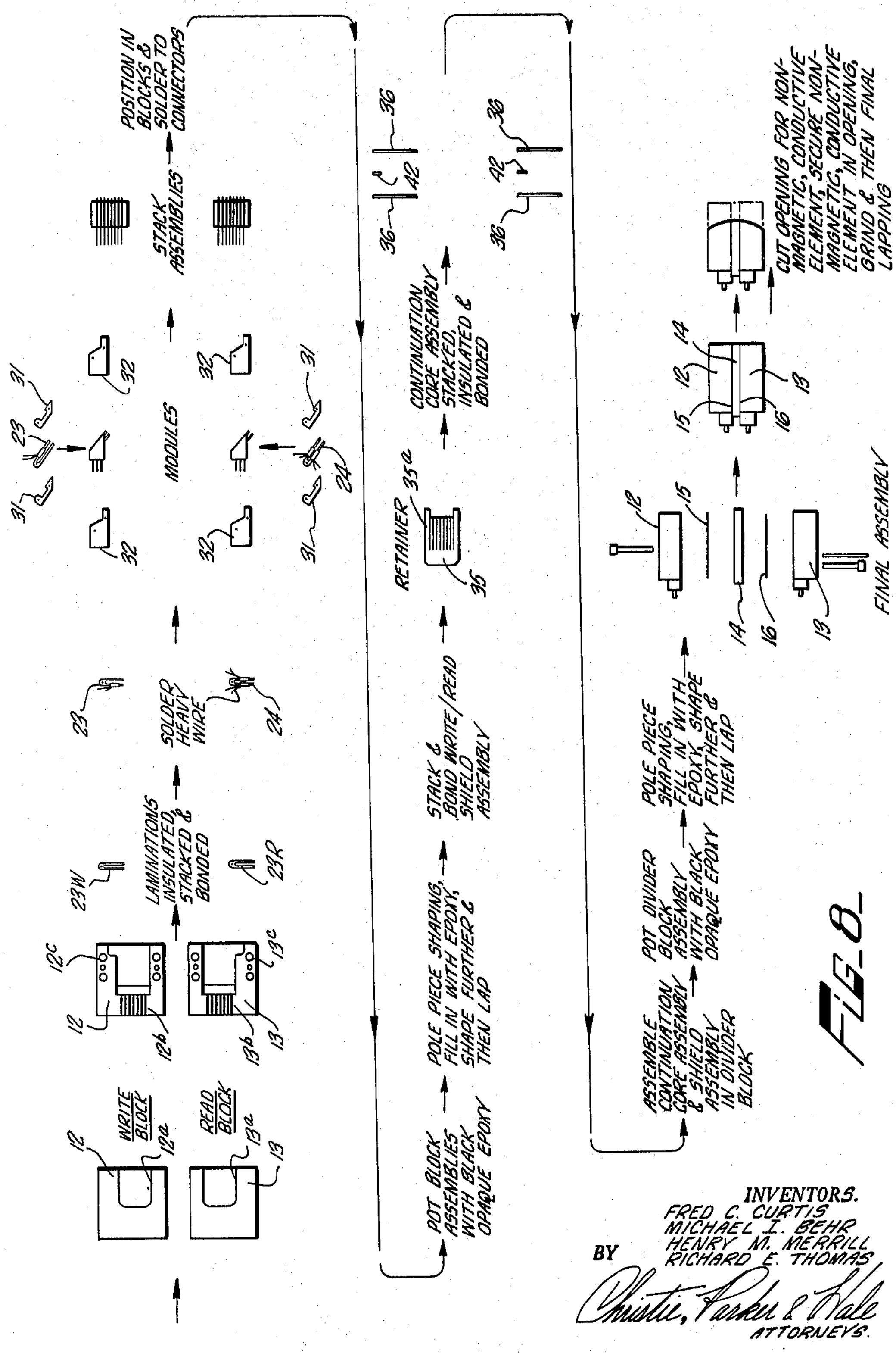
FIGURE 8 is an exploded view of a typical assembly procedure for manufacturing the transducer of FIG. 1.

The above described electromagnetic assemblies are arranged to be individually magnetically shielded. To this end, a non-magnetic spacer is arranged and defined in a substantially U-shaped configuration, similar to the spacer identified by the reference character 31, shown in FIG. 8, and is mounted to bridge the coils wound on the corresponding electromagnetic structures 23 and 24. The spacers 31 may be provided with a pair of aligning apertures having the same diameter and arranged concentric with the alignment apertures $23^a$ and $24^a$ and with a similar alignment aperture adjacent the open end of magnetic structures 23 and 24 for accepting an alignment pin to align this open end of the magnetic stack, see FIG. 1, for example. The spacers 31 are arranged on opposite sides of the magnetic assemblies 23 and 24 and are enclosed by means of inter-track magnetic shielding elements, similar to the shielding element identified by the reference character 32. Since it is desired to mount the electromagnetic structures for the write and read transducers 17 and 18 at an angular relationship to minimize the cross-coupling between associated write and read transducers, in accordance with the teachings of the above-identified co-pending application of Merrill and Wilson, the magnetic shielding elements 32 are defined to completely enclose the magnetic structures 23 and 24 except for allowing a small portion of the open end of these U-shaped structures to be exposed. The shielding elements 32, therefore, have a multiplicity of sides, as shown in FIGS. 3 and 4. The lead wires for the writing winding means 25 and the reading winding means 29 also extend outwardly from this modular arrangement. As shown in FIG. 8, the magnetic shielding elements 32 are arranged on opposite sides of the magnetic structures 23 and 24. This arrangement may then be encapsulated such as by potting to secure the modules together to allow them to be readily handled as a sub-assembly for insertion into their respective write and read blocks 12 and 13. It will be recognized that the electrical properties of the read and write coils will be examined during the manufacturing process to determine whether the coils are operative and have the correct electrical characteristics prior to final assembly into the read and write blocks. Once again, if any one module is incomplete or below standards, it need only be discarded rather than the entire transducer.

The thus assembled and checked modules 17 and 18 are then aligned and stacked by means of the positioning rods passed through the aligning apertures $23^a$ and $24^a$ in a special fixture therefor. The thus stacked assemblies of modules 17 and 18 are positioned in their respective write and read blocks 12 and 13 with the open end of the U-shaped structure arranged in alignment with the outer ends of the channels $12^b$ and $13^b$ in these blocks. The exposed heavy lead wires extend into their cavities $12^a$ and $13^a$ and are connected to the electrical connector. The electrical connector comprises a commercially available multi-pin connector of the type sold by the Continental Electronics Company and is similar to the connector identified by the reference character 33. The electrical connector abuts the writing and reading blocks 12 and 13 opposite the magnetic carrier exposed end thereof to receive the lead wires that are arranged in the cavities $12^a$ and $13^a$ and are electrically connected thereto by soldering or the like.

Figure 5:
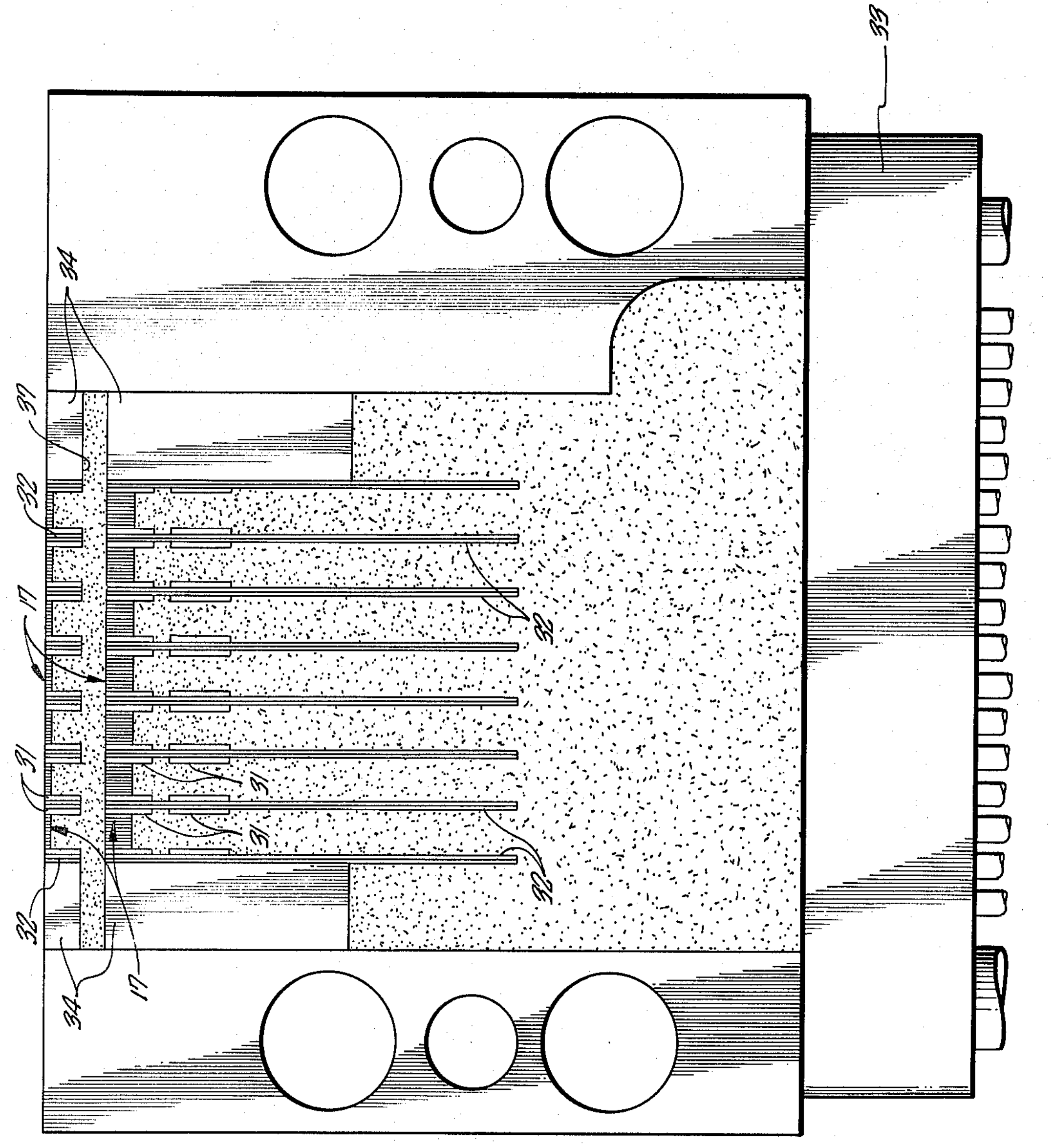
FIGURE 5 is an elevational view of the detached, finished write module of the transducer shown in FIG. 1.
Figure 6:
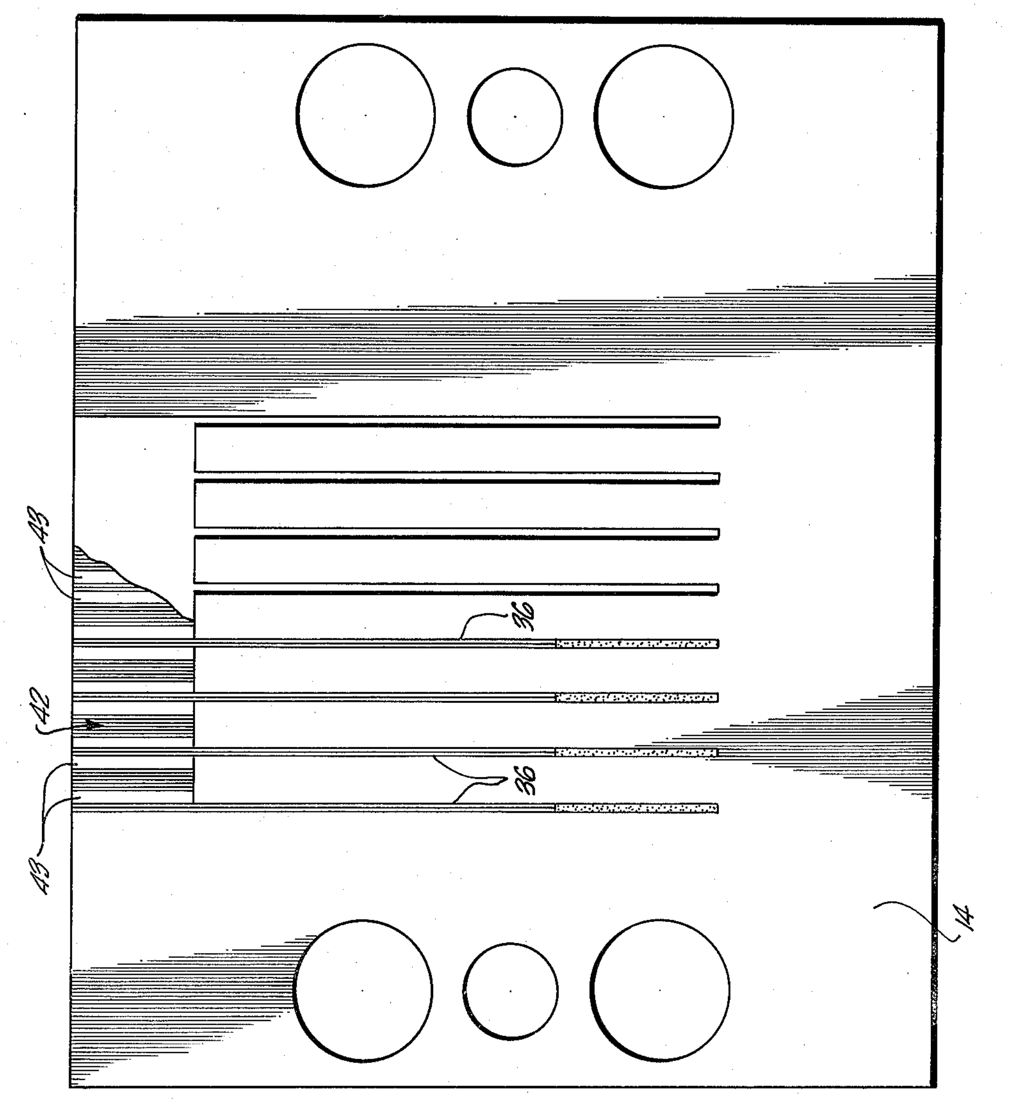
FIGURE 6 is an elevational view, with portions broken away, of the read side of the detached shield carrier module for the transducer shown in FIG. 1.
Figure 7:
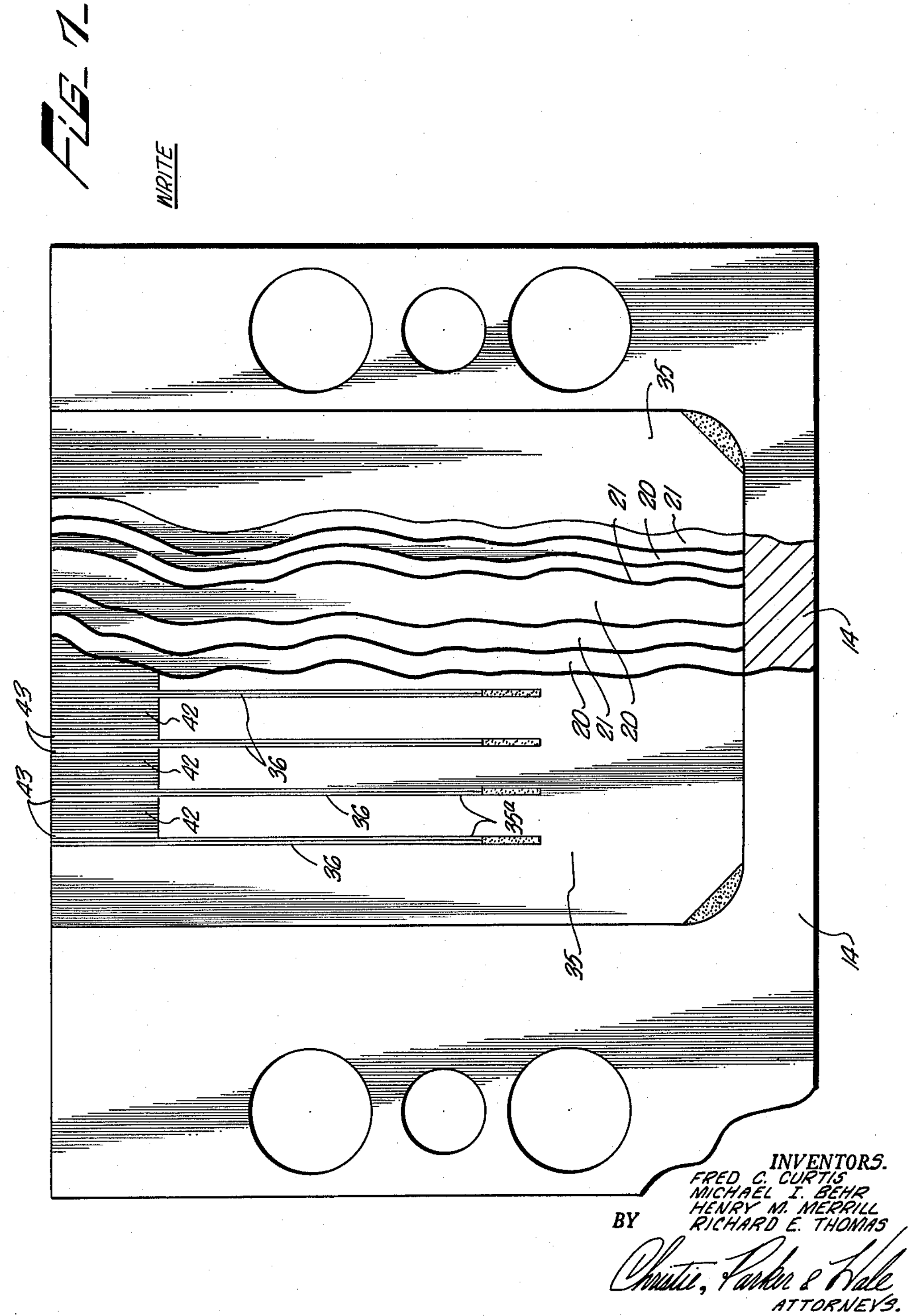
FIGURE 7 is an elevational view, with portions broken away, of the write side of the detached shield carrier module for the transducer of FIG. 1.

The electromagnetic structures are spaced in the write and read block by means of end spacers similar to the one identified by the reference character 34. These write and read blocks 12 and 13 may then be encapsulated or potted with a black opaque epoxy compound to fix the organization of the modules 17 and 18. The potted write and read assemblies have their interfaces ground to the required dimensions. After grinding, the magnetic carrier exposed pole faces are shaped to cause a concentration of the flux at the transducing gaps to minimize the leakage flux around the transducing gaps; the resulting magnetic structure upon assembly of the transducer 10 is best seen in FIG. 1. An examination of FIG. 1 will reveal that both the write and read blocks 12 and 13 as well as the divider block 14 have their magnetic structures similarly cut away to concentrate the flux at the transducing gaps. A transverse groove, respectively identified by the reference characters 37 and 38 on the write and read blocks 12 and 13, cooperates with similar grooves 39 and 40 arranged on the magnetic core pieces carried by the divider block 14. The final, finished structure showing the magnetic structure carried by the write block 12, including the transverse pole shaping groove 37, is best seen in FIG. 5.

It should be recognized that the cutting away of the magnetic material on the three blocks 12, 13 and 14 in this fashion reduces the cross-sectional area of the portion of the magnetic structure adjacent the transducing gap whereby a high reluctance path is defined with respect to the flux paths bridging the transducing gaps and thereby causes a concentration of flux passing through the gaps and minimizes the leakage flux whereby an improved and more efficient transducing action results.

The divider block 14 comprises a substantially rectangular, non-magnetic element, preferably of aluminum, having a cavity $14^d$ (see FIG. 1) arranged on one side thereof to accommodate the shielding means mounted thereon. The shielding means is first assembled by building up a stack of electrostatic and electromagnetic laminations of preselected thickness. The electrostatic shields 20 may comprise a thin, rectangular, conductive element, which may be copper, while the electromagnetic shields 21 comprise a thin, rectangular, magnetic element, such as a Hy Mu 80 metal. The shielding means is preferably arranged whereby the electromagnetic and electrostatic shields 20 and 21 are alternately arranged on opposite sides of a central electrostatic shield 20. Although any number of shields may be utilized, three electrostatic shields 20 are utilized and the outer electrostatic shields are arranged outwardly of the stack to sandwich an electromagnetic shield 21 therebetween. As will be seen from examining the drawings, it will be recognized that the outer shielding elements 20 engage the magnetic core assemblies carried by the divider block 14. When the outer shielding elements are defined as electromagnetic shields, it has been found that the shields define secondary transducing gaps and modify the flux path of the transducing structure. The formation of these secondary gaps causes additional signals to be read from the magnetic tape, such as to add or to substract from the information recorded on the tape and, therefore, results in the delivery of erroneous information to the associated electronics or computer system proper. The formation of these secondary transducing gaps is prevented in accordance with this invention through the placement of the electrostatic shielding elements 20 adjacent the magnetic structure, as illustrated.

When assembled in this fashion, then, the stack is bonded together and then assembled into the divider block cavity $14^d$ and maintained therein by positioning a retaining element 35 over the exposed shielding element 20. The retaining element 35 includes a plurality of longitudinally extending grooves $35^a$ similar to the grooves $12^b$ and $13^b$, for retaining the inter-track shielding elements similar to the one identified by the reference character 36. The retaining element 35, when positioned in the divider block 14, allows the outermost end of the cavity $14^d$ to be exposed. This outer end of the divider block 14 secures the continuation core assemblies 42 for the write and read electromagnetic structures 17 and 18.

The continuation core assemblies 42 comprise a stack of insulated, bonded, thin, rectangular, magnetic laminations of the same material as the U-shaped laminations 23W and 23R defining the magnetic structure proper. These continuation core assemblies 42 are arranged on the divider block 14 on the opposite sides of the shielding elements 20 at the magnetic carrier exposed end thereof between a pair of non-magnetic spacers 43 and which spacers may be a beryllium copper material. After the divider block 14 is assembled in this fashion, it may be encapsulated or potted with a black opaque epoxy to secure the sub-assembly together and then has its interface ground to the desired dimension. After the grinding operation, the continuation core assemblies 42 are cut to provide the pole shaping grooves 39 and 40 described hereinabove. The exposed surfaces of the divider block 14 may then be lapped to provide both sides with the required dimensions to match with the lapped surfaces of the write and read blocks 12 and 13 when fastened together.

The divider block 14 may also be provided with transverse apertures arranged in alignment with the securing apertures for the write block and read block 12 and 13 to allow the three elements to be fastened together.

With these three modular assemblies completed, the dual gap read-write transducer 10 may then be fastened together with the gap materials 15 and 16 to complete the assembly of the transducer 10. The gap materials 15 and 16 are arranged on opposite sides of the divider block 14 and are arranged coextensive therewith so that when the write block and the read block 12 and 13 are fastened together the gap materials 15 and 16 are arranged between the magnetic structures 23 and 24 and the continuation core assemblies 42 whereby they form the high reluctance gap or transducing gaps in an essentially closed magnetic structure defined by the closing of the U-shaped structures 23 and 24 by the continuation core assemblies 42. When the three blocks are assembled and secured together in this fashion, the final turning, grinding, and lapping operations may be performed on the magnetic carrier exposed surface of the transducer 10 such as to give it a final radius or contour conventional with magnetic transducers.

It should be noted, however, that prior to the final lapping, the thus assembled and turned transducer 10 is cut or milled at the magnetic carrier exposed end of the divider block 14 with a longitudinally extending aperture 44, shown as a V slot to accept the non-magnetic, conductive element 22. The non-magnetic element 22 prevents any inter-action between the magnetic carrier and the shielding means, in particular the electromagnetic shielding elements 21. It has been found that a de-magnetizing effect is produced upon the magnetic carrier itself when the electromagnetic shielding elements are exposed to the carrier. This results due to the bridging of a recorded binary bit between electromagnetic shielding elements of the shielding means and, by spacing the electromagnetic shielding elements from the magnetic carrier, improved operation results. Furthermore, to minimize the contour effect due to the definition of a sharp angle with the continuation core assemblies 42, the groove 44 and, therefore, the element 22 is defined to extend into the core assemblies 42.

After the element 22 is secured in the groove 44, the transducer 10 is finally lapped to the desired dimension to complete the assemblies thereof.

The transducer 10 will provide satisfactory operation and minimum cross-talk as described, however, conventional external shielding may be employed to improve the cross-talk even more. This external shielding may take the form of a shield arranged on the opposite side of the magnetic carrier from the transducer 10 to effectively define a continuation of the shielding assembly of the divider block 14.

It will now be recognized that the present invention has advanced the state of the art through the provision of a dual gap, read-write transducer having a minimum amount of cross-coupling with an inter-gap spacing of the order of 0.150 inch. The spacing, however, may be reduced to approximately 0.05 inch as discussed in the above-identified Merrill and Wilson co-pending application.

What is claimed is:

1. A dual gap transducer for simultaneously writing and reading on a plurality of channels on a magnetic carrier comprising an electromagnetic-electrostatic shielding assembly arranged transverse to the direction of travel of the magnetic carrier during transducing operations, a plurality of pairs of reading and writing transducers having a transducing portion spaced on opposite sides of said shielding assembly with each pair of reading and writing transducing portions being exposed and aligned in the same plane for simultaneously reading and writing on a single channel of a magnetic carrier, and inter-track shielding means arranged on opposite sides of each transducer and extending substantially transverse to said shielding assembly, each of said pairs of reading and writing transducers comprising an electromagnetic structure angularly arranged with respect to said shielding assembly in a diverging relationship for minimizing the cross-coupling between adjacent electromagnetic structures.

2. A dual gap transducer for simultaneously writing and reading on a plurality of channels on a magnetic carrier comprising a substantially non-magnetic body having a surface adapted to be exposed to a magnetic carrier, a shielding assembly including spaced apart electromagnetic shielding elements extending substantially transverse to said exposed surface of said body, and a plurality of pairs of shielded electromagnetic reading and writing transducers with a single pair of reading and writing transducers arranged on opposite sides of said shielding assembly for simultaneously reading and writing in a single channel by a magnetic carrier, each of said reading and writing transducers having a transducing gap adjacent said shielding assembly at said exposed surface and having their opposite ends oriented in a diverging relationship with respect to said shielding assembly to electrically minimize cross-coupling between said pair of read and write transducers, said shielding assembly including a non-magnetic, metallic member arranged at said exposed surface of the body and coextensive therewith and adapted to isolate the electromagnetic elements from a magnetic carrier when the transducer is in use.

3. A dual gap transducer for simultaneously writing and reading on a plurality of channels on a magnetic carrier as defined in claim 2 wherein said read and write transducers are of similar modular construction and have substantially closed loop, oblong configuration with the portion adjacent said transducing gaps being modified to provide a high reluctance path for any leakage flux around said transducing gaps and to correspondingly provide a lower reluctance path through said transducing gap to concentrate the flux therethrough.

4. A dual gap transducer for simultaneously writing and reading on a plurality of channels on a magnetic carrier as defined in claim 2 wherein said shielding assembly is defined with the magnetic carrier exposed surface to prevent the formation of secondary gaps functioning as transducing gaps.

5. A dual gap transducer for simultaneously writing and reading on a plurality of channels on a magnetic carrier as defined in claim 2 wherein said shielding assembly includes a pair of substantially non-magnetic, electrically conductive elements arranged on opposite ends thereof to engage the reading and writing transducers and terminating at said non-magnetic, high-conductivity member and defined relative to said transducing gaps to prevent the formation of a secondary transducing gap.

6. A read-write transducer comprising a pair of substantially non-magnetic bodies each mounting a plurality of pairs of individually shielded read and write transducers for effecting simultaneous transducing operations in different channels of a magnetic carrier, each of said transducers comprising an elongated, low reluctance magnetic structure angularly arranged therein to have an end exposed to a magnetic carrier and winding means magnetically coupled to said magnetic structure, a divider body comprising a plurality of alternately arranged electromagnetic and electrostatic shielding members having at least a central electrostatic shielding member and a pair of outer electrostatic shielding members arranged on opposite sides of said central member and each being spaced therefrom by at least a single electromagnetic shielding member, a pair of low reluctance magnetic members carried by said dividing body and arranged adjacent one of said outer shielding members, said pair of magnetic members being defined relative to said elongated magnetic structure to provide a substantially closed loop magnetic path when assembled together, a pair of high reluctance members, means for securing said pair of bodies together on opposite sides of the divider body with one of the high reluctance members sandwiched between same and adjacent the magnetic carrier exposed end of said magnetic structure, the thus secured transducer assembly being further defined whereby the high reluctance members function as transducing gaps and are aligned in the same plane to provide simultaneous read and write transducing operations on the same track of a magnetic carrier and whereby each pair of transducers for the same track have an overall angular relationship for electrically minimizing cross-coupling between the associated read and write pair.

7. A read-write transducer comprising a pair of substantially non-magnetic bodies each mounting a plurality of pairs of individually shielded read and write transducers for effecting simultaneous transducing operations in different channels on a magnetic carrier, each of said transducers comprising an elongated, low reluctance magnetic structure angularly arranged therein to have an end exposed to a magnetic carrier and winding means magnetically coupled to said magnetic structure, a divider body comprising a plurality of alternately arranged electromagnetic and electrostatic shielding members having at least a central electrostatic shielding member and a pair of outer electrostatic shielding members arranged on opposite sides of said central member and each being spaced therefrom by at least a single electromagnetic shielding member, a pair of low reluctance magnetic members carried by said dividing body and arranged adjacent one of said outer shielding members, said pair of magnetic members being defined relative to said elongated magnetic structure to provide a substantially closed loop magnetic path when assembled together, a pair of high reluctance members, means for securing said pair of bodies together on opposite sides of the divider body with one of the high reluctance members sandwiched between same and adjacent the magnetic carrier exposed end of said magnetic structure, the thus secured transducer assembly being further defined whereby the high reluctance members function as transducing gaps and are aligned in pairs in the same plane to provide a simultaneous read and write transducing operations on the same track of a magnetic carrier and whereby each pair of transducers for the same track have an overall angular relationship for minimizing cross-coupling between same, said divider body further including a non-magnetic member longitudinally extending at least coextensive with the extreme transducers and arranged intermediate said pair of low reluctance magnetic members at the exposed end thereof to prevent interaction between the magnetic carrier and said divider shielding assembly.

8. A read-write transducer comprising a substantially non-magnetic member mounting a plurality of individually shield electromagnetic assemblies for effecting a reading operation in different channels on a magnetic carrier having binary coded information recorded thereon, each of said assemblies comprising a substantially U-shaped, low reluctance, magnetic member, separate electrical winding means wound on each arm of said U-shaped member and connected in a series aiding relationship, said assembly being angularly arranged in said non-magnetic body at approximately 40–45 degrees and having an end exposed to a magnetic carrier, another substantially non-magnetic body mounting a similar plurality of individually shielded, electromagnetic assemblies for effecting a writing operation of binary coded information in different channels on a magnetic carrier, each of said writing assembles comprising a substantially U-shaped, low reluctance, magnetic member and electrical winding means wound on an arm of said U-shaped member, said assembly being angularly arranged in said non-magnetic body at approximately 40–45 degrees and having an end exposed to a magnetic carrier, a divided body comprising a plurality of alternately arranged electromagnetic and electrostatic shielding members having at least a central electrostatic shielding member and a pair of outer electrostatic shielding members arranged on opposite sides of said central member and spaced therefrom by at least a single electromagnetic shielding member, a pair of low reluctance magnetic members carried by said dividing body and arranged adjacent one of said outer shielding members, said pair of magnetic members being defined relative to said elongated magnetic structure to provide a sustantially closed loop magnetic path when assembled together side by side, a pair of high reluctance members, means for securing the pair of bodies together on opposite sides of the divider body with one of the high reluctance members sandwiched between same and adjacent the magnetic carrier exposed end of said magnetic structure whereby the high reluctance member associated with the electromagnetic assemblies for reading functions as a reading gap and is aligned in the same plane with the other similar member associated with the other assemblies functioning as a writing gap for simultaneously reading and writing in the same channel on a magnetic carrier, said gaps being further defined with a reduced cross-sectional area adjacent thereto for minimizing flux fringing thereat whereby the flux is concentrated at the gaps, the dividing body further including means for separating the electromagnetic members from the magnetic carrier exposed surface to prevent inter-action between same.

9. A read-write transducer comprising a substantially non-magnetic member mounting a plurality of similarly constructed individually shielded electromagnetic modular assemblies for effecting a reading operation in different channels on a magnetic carrier, each of said modular assemblies comprising a plurality of insulatively stacked, substantially U-shaped, low reluctance magnetic laminations and separate electrical winding means wound on each arm of said U-shaped member and connected in a series aiding relationship, said modular assembly being arranged on said non-magnetic body with an end exposed to a magnetic carrier, another substantially non-magnetic member mounting a plurality of similarly constructed individually shielded electromagnet modular assemblies for effecting a writing operation in different channels on a magnetic carrier, each of said writing modular assemblies comprising a plurality of insulatively stacked, substantially U-shaped, low reluctance magnetic laminations and electrical winding means wound on an arm of said U-shaped member, said modular assembly being arranged in said non-magnetic member with an end exposed to a magnetic carrier, a divider body comprising a plurality of alternately arranged electromagnetic and electrostatic shielding members having at least a central electrostatic shielding member and a pair of outer electrostatic shielding members arranged on opposite sides of said central member and spaced therefrom by at least a single electromagnetic shielding member, a pair of low reluctance magnetic members carried by said dividing body and arranged adjacent one of said outer shielding members, said pair of magnetic members being defined relative to said elongated magnetic structure to provide a substantially closed loop magnetic path when assembled together, a non-magnetic member arranged intermediate said pair of magnetic members at the magnetic carrier exposed end of said dividing body to isolate said electromagnetic shielding members from the magnetic carrier, a pair of high reluctance members, means for securing said pair of bodies together on opposite sides of the divider body with one of the high reluctance members sandwiched between same and adjacent the magnetic carrier exposed end of said magnetic structure, the thus secured transducer assembly being further defined whereby the high reluctance members function as transducing gaps and are aligned to provide a simultaneous transducing operation on the same track of a magnetic carrier.

10. A dual gap transducer for writing binary coded information on a magnetic carrier and reading the same information immediately thereafter wherein said reading and writing gaps are spaced apart on the order of .150 inch, said transducer comprising an electromagnetic-electrostatic shielding assembly including a non-magnetic member arranged at the magnetic carrier exposed end of the transducer for separating the shielding assembly from a magnetic carrier, a plurality of individually electromagnetically shielded, spaced apart reading transducers arranged on one side and adjacent to said shielding assembly, and a plurality of individually, electromagnetically shielded spaced apart writing transducers arranged on the opposite side of said shielding assembly with each writing transducer aligned with a reading transducer for simultaneously writing and reading in the same channel of a magnetic carrier, the pair of reading and writing transducers for a single channel having an overall angular relationship of the order of 90 degrees.

11. A dual gap transducer for writing binary coded information on a magnetic carrier and reading the same information immediately thereafter wherein said reading and writing gaps are spaced apart on the order of .150 inch, said dual gap transducer including a non-magnetic body having a surface adapted to be exposed to a magnetic carrier mounting a pair of magnetic transducing structures including winding means wound thereon for selectively and alternately coupling binary coded electrical signals to and from a magnetic carrier by means of transducing gaps integral with the transducing structures, said transducing structures being mounted in a diverging relationship to electrically minimize cross-coupling between same and with their transducing gaps arranged in alignment and coextensive with said body surface for effecting simultaneous transducing operations on the same channel of a magnetic carrier, and shielding means mounted in said body intermediate said transducing structures and having an outer surface engaging each of said magnetic structures adjacent said transducing gaps to space them apart and terminating at said body surface, the outer surfaces of said shielding means comprising a non-magnetic member defined to prevent the formation of undesired transducing gaps, said shielding means being further characterized as including a non-magnetic, metallic portion defined between said transducing gaps.

12. A dual gap transducer for simultaneously writing and reading on a single channel of a magnetic carrier comprising a body mounting a pair of reading and writing electromagnetic transducers having transducing gaps very closely spaced from one another, shielding means including electromagnetic shielding elements mounted on said body intermediate said transducers and functioning as a gap to gap spacer, the gap to gap spacing being further characterized as resulting in the de-magnetization of the magnetic carrier as a result of the interaction of the electromagnetic members of the dual gap transducer and the magnetic carrier, said shielding means being defined to include a non-magnetic portion at the magnetic carrier exposed end for isolating the electromagnetic members from the magnetic carrier to prevent said demagnetization.

13. A dual gap transducer for simultaneously writing and reading on each of a plurality of channels of a magnetic carrier comprising a substantially non-magnetic body having a surface adapted to be exposed to a magnetic carrier, a shielding assembly extending substantially transverse to said exposed surface of said body, and a plurality of pairs of reading and writing transducers with each pair of reading and writing transducers arranged on opposite sides of said shielding assembly for simultaneously reading and writing in a single channel of the magnetic carrier, each of said reading and writing transducers having a transducing gap adjacent said shielding assembly at said exposed surface, said shielding assembly including a non-magnetic, high conductive, metallic member arranged at said exposed surface of the body and coextensive therewith and adapted to isolate the electromagnetic shielding element from a magnetic carrier during a transducing operation.

14. A dual gap transducer for simultaneously writing and reading on each of a plurality of channels on a magnetic carrier comprising a substantially non-magnetic body having a surface adapted to be exposed to a magnetic carrier, a shielding assembly extending substantially transverse to said exposed surface of said body and thereby the direction of travel of a magnetic carrier during transducing operations, and a plurality of pairs of reading and writing transducers with each pair of reading and writing transducers arranged on opposite sides of said shielding assembly for simultaneously reading and writing in a single channel of the magnetic carrier, each of said reading and writing transducers having a transducing gap adjacent said shielding assembly at said exposed surface wherein the gap to gap spacing is on the order of 0.150 inch or less, said shielding assembly being defined with a non-magnetic portion arranged at said exposed surface of the body and co-extensive therewith for isolating the electromagnetic shielding element from a magnetic carrier during a transducing operation to prevent the degaussing of the magnetic carrier.

References Cited by the Examiner

UNITED STATES PATENTS

| | | | |
|---|---|---|---|
| 2,922,231 | 1/1960 | Witt et al. | 179—100.2 |
| 3,037,089 | 5/1962 | Warren | 179—100.2 |
| 3,165,592 | 1/1965 | Brette | 179—100.2 |

FOREIGN PATENTS

| | | |
|---|---|---|
| 1,270,817 | 7/1961 | France. |
| 913,296 | 12/1962 | Great Britain. |

IRVING L. SRAGOW, *Primary Examiner.*

R. M. JENNINGS, F. C. WEISS, H. D. VOLK, *Assistant Examiners.*